Sept. 26, 1950   W. J. FLEMING   2,523,869
BUS DUCT HANGER
Filed Jan. 29, 1949
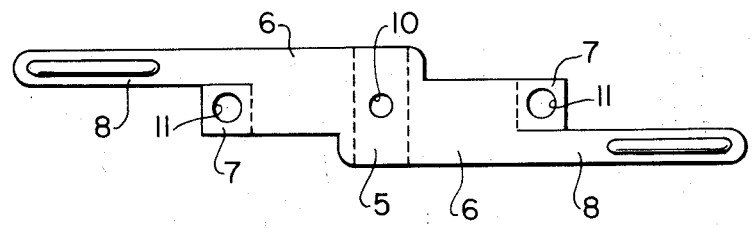
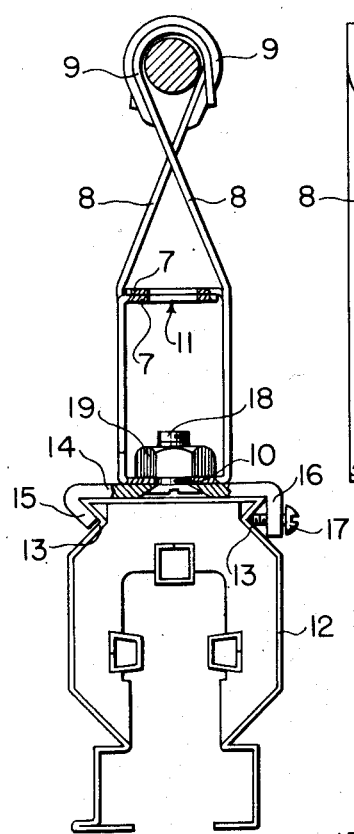
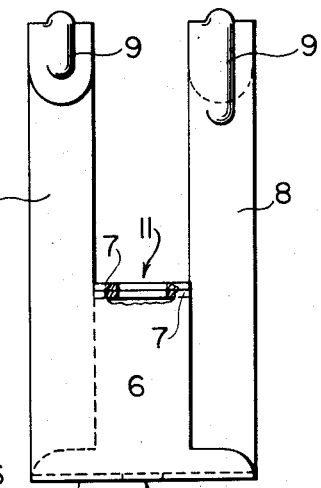
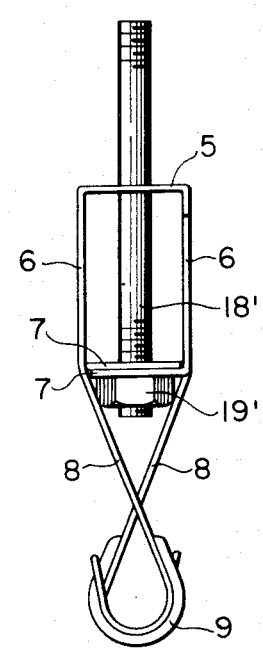
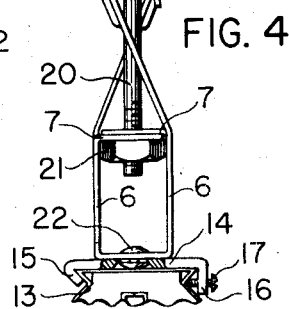
INVENTOR
William J. Fleming
BY
ATTORNEY Patented Sept. 26, 1950

2,523,869

UNITED STATES PATENT OFFICE 2,523,869

BUS DUCT HANGER

William J. Fleming, New Britain, Conn., assignor to The Trumbull Electric Manufacturing Company, Plainville, Conn., a corporation of Connecticut Application January 29, 1949, Serial No. 73,639

5 Claims. (Cl. 248—58)

This invention relates particularly to a hanger adapted to support a power feed duct. It is also adapted to support a cable or messenger wire or the like.

The main object is to provide a simple and strong but inexpensive hanger which can be interchangeably used as a support in many ways.

Fig. 1 is an end view and partial section showing a complete hanger as used for supporting a power feed duct from an overhead cable.

Fig. 2 is a face view of the hanger.

Fig. 3 is an end view showing the hanger arranged for supporting a cable or other device from an overhead anchorage.

Fig. 4 is a partial sectional view showing the hanger as applied to a duct and supported from above.

Fig. 5 shows on a smaller scale a blank from which the hanger body is to be made.

The hanger is formed of sheet metal blanked out and bent along the dotted lines as indicated in Fig. 5.

The central base 5 has two side wings 6, 6 bent at right angles to the base and parallel to each other.

Cross pieces 7, 7 are bent to overlap and reinforce each other at the outer ends of the side wings.

The arms 8, 8 extend outwardly from the opposite corners of the wings and terminate in overlapping hooks 9, 9 which may be corrugated for strength.

The base 5 of the hanger has a central passage 10 and the cross-pieces 7, 7 also have passages 11 in alinement with passage 10.

The duct 12 has grooves 13, 13 along its upper edges and the hanger body is secured to the duct by a plate 14 which has two flanges 15 and 16 which overlap the edges of the duct. These flanges may be in the form of hooks such as 15 to permit the plate to be slid along the duct or preferably one flange such as 16 has one or more clamp screws 17 to engage in a groove of the duct to facilitate assembly.

The hanger base 5 is connected to the plate 14 by a bolt 18 and nut 19 so that the parts can be handled as a unit.

Fig. 3 shows the device arranged for supporting the hanger by a bolt 18' which passes through the base 5 and the two cross-pieces 7, 7 and is held by a nut 19'. Additional strength may be provided by screwing a nut on the bolt 18' up beneath the base 5.

Similarly the hanger of Fig. 1 may be reinforced by extending the bolt 18 up through the openings in the cross-pieces 7, 7 and screwing a nut down on the bolt to the upper cross-pieces.

In the form shown in Fig. 4, an anchor bolt 20 passes through the cross pieces 7, 7 and is held by a nut 21. This nut being positioned between the wings 6, 6 cannot turn except with the hanger which makes it possible to adjust the height of the hanger by simply rotating it. By pivoting the hanger at 22 on the plate 14 this adjustment can be made after the plate is attached to the duct. It is thus possible to secure vertical alinement of various points of a suspended duct.

I claim:

1. A hanger member formed of a single blank of metal having a perforated base, side wings connected to opposite edges of the base, perforated cross-pieces connected to the wings and overlapping each other, hook-like arms connected to the wings and a bolt support passing through the perforations in said base and said overlapping pieces, between the wings.

2. A hanger member formed of a single blank of metal having a perforated base, side wings connected to opposite edges of the base, perforated cross-pieces connected to the wings and overlapping each other, hook-like arms connected to the wings alongside of the respective cross-pieces, and a plate bolted to the base shaped to clamp a device to be supported.

3. A hanger member formed of a single blank of metal having a perforated base, side wings connected to opposite edges of the base, cross-pieces connected to the wings, means for connecting said cross-pieces and hook-like arms connected to the wings alongside of the respective cross-pieces.

4. A hanger formed of a single strip of sheet metal having a main central portion centrally perforated with wings extending at right angles from the edges of the central section, each wing having a hook-like arm extending from one edge and a lug bent at right angles to the wing, said lugs overlapping each other and each having a perforation in alinement with the central perforation in the main central portion.

5. A blank of sheet metal for forming a hanger comprising an elongated body having reduced hook forming end portions forming extensions of the body on opposite edges thereof, said body being slit longitudinally inwardly along the inner edge of each extension and having a central opening midway its ends and having an opening laterally of each slit and outwardly of the inner end of the slit, all of said openings being in alinement longitudinally of the body.

WILLIAM J. FLEMING.

REFERENCES CITED

The following references are of record in the file of this patent:

UNITED STATES PATENTS

| Number | Name | Date |
|---|---|---|
| 948,902 | Noyes | Feb. 8, 1910 |
| 950,978 | Williams | Mar. 1, 1910 |
| 2,339,564 | Goldberg et al. | Jan. 18, 1944 |
| 2,347,113 | King | Apr. 18, 1944 |